United States Patent
Baranowski et al.

(10) Patent No.: US 6,473,630 B1
(45) Date of Patent: Oct. 29, 2002

(54) METHOD AND APPARATUS FOR POWERING A WIRELESS HEADSET USED WITH A PERSONAL ELECTRONIC DEVICE

(75) Inventors: Robert Baranowski, San Diego, CA (US); Roger William Berg, Carlsbad, CA (US)

(73) Assignees: Sony Corporation (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/422,969

(22) Filed: Oct. 22, 1999

(51) Int. Cl.[7] .............................. H04B 1/38; H04M 1/00
(52) U.S. Cl. .................... 455/572; 455/569; 455/572; 455/573; 379/430
(58) Field of Search ................... 455/550, 568, 455/569, 572, 573, 574, 127; 379/430

(56) References Cited

U.S. PATENT DOCUMENTS 5,113,428 A * 5/1992 Fitzgerald .................. 379/61
5,590,417 A * 12/1996 Rydbeck ..................... 455/89
5,631,503 A * 5/1997 Cioffi ......................... 307/66

FOREIGN PATENT DOCUMENTS

JP 06327169 A * 11/1994 ........... G01R/31/36

* cited by examiner

Primary Examiner—Edward F. Urban
Assistant Examiner—Meless Zewdu
(74) Attorney, Agent, or Firm—Rader, Fishman & Grauer, PLLC; Ronald P. Kananen, Esq.

(57) ABSTRACT

A headset for wireless communicating with a personal electronic device, such as a wireless phone, provides audio output based on an audio signal from the personal electronic device. A secondary battery in the headset provides power for the headset and is rechargeable from a primary battery in the personal electronic device, thereby allowing the user to recharge the headset in the field. Alternatively two secondary batteries may be provided. One of the secondary batteries can be used to power the headset, while the other is connected to the personal electronic device for recharging from the primary battery. When the battery in the headset becomes depleted, the batteries are exchanged.

19 Claims, 4 Drawing Sheets

METHOD AND APPARATUS FOR POWERING A WIRELESS HEADSET USED WITH A PERSONAL ELECTRONIC DEVICE

FIELD OF THE INVENTION

The present invention relates to the field of personal portable electronic devices. Specifically, the present invention relates to the field of personal electronic devices that provide an audio signal through a headset or headphones for the user. More specifically, the present invention relates to a method and apparatus for providing battery power in such a headset that communicates wirelessly with the personal electronic device, e.g., a wireless telephone unit, providing the audio signal.

BACKGROUND OF THE INVENTION

Portable electronic devices such as wireless telephones, pagers, personal digital assistants (PDAs), personal stereos including tape, CD and mini-disc players, and combinations thereof, continue to grow smaller while offering more features due to technological advances in electronic circuitry. This decrease in size promotes the principle advantage of such devices which is their portability.

Operating on battery power, personal electronic devices can provide a host of services wherever the user happens to be. For example, the devices mentioned above can provide telephonic communication, text communication, music or other audio programming, or basic computing power virtually whenever and wherever necessary.

The portability of personal electronic devices is promoted not only by their small size, but also by how easily they can be carried or worn by users. Another important aspect to portability is the extent to which the user must use his or her hands to operate the device. A device that can be operated largely hands-free is easier to use while performing other tasks, such as driving or writing, and is therefore more useful.

With personal electronic devices that produce an audio signal, particularly wireless telephones, the user must typically hold the phone to his or her ear to hear and conduct a phone call. This typically requires continuous use of a user's hands. Consequently, there is a need in the art for a method and apparatus allowing a user better hands-free operation of a personal electronic device outputting an audio signal.

SUMMARY OF THE INVENTION

It is an object of the present invention to meet the above-described needs and others. Specifically, it is an object of the present invention to provide a method and apparatus allowing a user better hands-free operation of a personal electronic device outputting an audio signal. Additionally, it is a further object of the present invention to provide an efficient method and apparatus for powering a-wireless headset for use with personal electronic devices.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a personal electronic device outputting an audio signal including: a primary battery located in the personal electronic device; a headset for providing wireless communication with the personal electronic device for transducing the audio signal into audible sound; a secondary battery located in the headset for powering the headset; and a charger for recharging the secondary battery from the primary battery. By way of example, the personal electronic device may be a wireless telephone unit, in which case, the headset would include a microphone. Preferably, the charger also includes an upconverter.

The charger may be disposed in the headset so that the secondary battery is charged when the headset is connected to the personal electronic device by a power coupling. Alternatively, there may be an additional secondary battery. In which case, the secondary battery and the additional secondary battery are interchangeable in connection to either the headset or the personal electronic device. The charger may then be disposed in the personal electronic device for charging either the secondary battery or the additional secondary battery depending on which is connected to the personal electronic device.

An external charger may be provided for connection to the personal electronic device to recharge the primary battery.

The present invention also encompasses a method of powering a personal electronic device that outputs an audio signal as described above. The method is performed by recharging a secondary battery located in the headset from the primary battery located in the personal electronic device. As above, the headset provides wireless communication with the personal electronic device for transducing the audio signal as audible sound.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
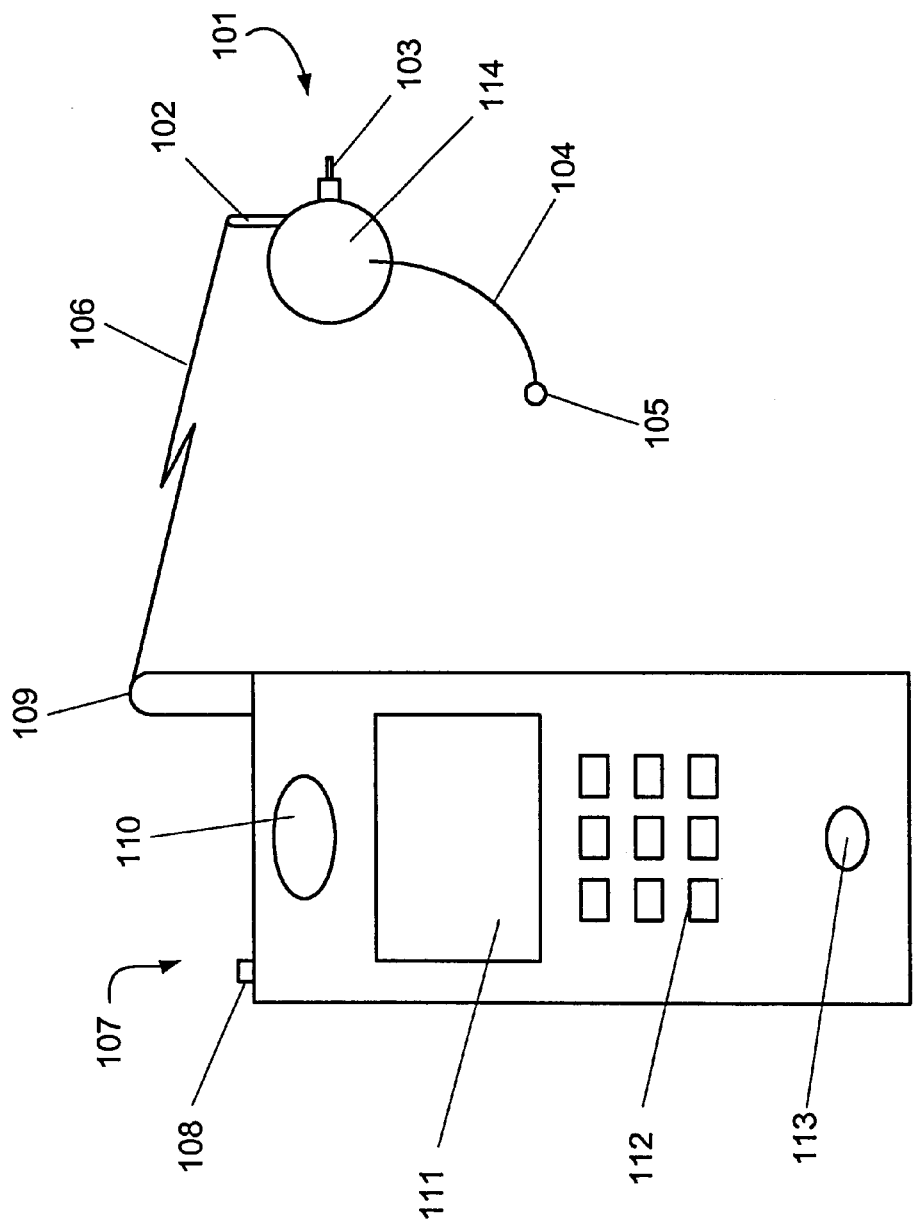
FIG. 1 is an illustration of a first embodiment of the present invention.

As shown in FIG. 1, the present invention provides a wireless telephone unit (107) which may incorporate the features of wireless telephones generally. For example, the wireless telephone unit (107) of the present invention may include a speaker (110) and microphone (113) with which a user can conduct a telephone call. A keypad (112) may be included for entering data or a phone number to be called. A display (111) shows the input from the keypad or responds to other user input to assist the user in operating the phone (107) An antenna (109) allows the telephone unit (107) to communicate with the wireless telephone infrastructure of a service provider.

As an accessory to the wireless telephone unit (107), the present invention provides a headset (101) which can be used in conjunction with the telephone unit (107) to conduct a phone call. The headset (101) provides a user with at least one speaker (114) that can be used to listen to a phone call received with the phone unit (107).

Under the principles of the present invention, the headset (101) can assume a number of possible configurations. For example, the headset (101) may have two speakers, one for each ear of the user, where the two speakers are supported by a headband that is worn over the top of the user's head. Alternatively, the headset (101) may have only a single speaker with a clip, hook or loop for clipping the headset (101) to, or hanging the headset (101) from, the user's ear. Any of these and other configurations are within the scope of the present invention.

Additionally, a microphone (105) is provided on the headset (101) to allow the user to speak and have that speech transmitted by the phone unit (107) in the course of a phone call. Preferably, the microphone (105) is supported on a microphone arm (104) so as to optimally place the microphone (105) near the mouth of a user who is wearing the headset (101).

An antenna (102) allows the headset (101) to communicate wirelessly (106) with the telephone unit (107). The phone unit (107) may use the single antenna (109) to communicate with both the wireless telephone infrastructure of the service provider and the headset (101). Alternatively, the phone unit (107) may have a dedicated antenna for communication with the headset (101).

As the communication between the headset (101) and the phone unit (107) is likely need over only a short range, it may be preferably to conduct the wireless communication (106) between phone (107) and headset (101) using baseband FM signaling. However, any form of wireless signaling between the phone unit (107) and the headset (101) is within the scope of the present invention.

Because the headset (101) communicates with the phone unit (107) wirelessly to provide optimal freedom to the user, the headset (101) must be provided with its own independent power source. It is also necessary that the power source for the headset (101) be as compact as possible. Making the headset (101) bulky with a large power source would clearly not serve the interests of the user. Unfortunately, the size of the power source also tends to dictate the length of time it can provide power without being recharged. Thus, it is necessary to provide a power source that accommodates both the need to be compact and to the provide power for reasonable lengths of time without recharging.

To accommodate these conflicting considerations, the present invention allows the headset (101) to be recharged from the more substantial power source of the phone unit (107) as needed. In this way, the headset (101) can be recharged anywhere and need not be taken to home or office for recharging. Consequently, the portability of the device is promoted and its operating time in the field without recharging is maximized.

Figure 3:
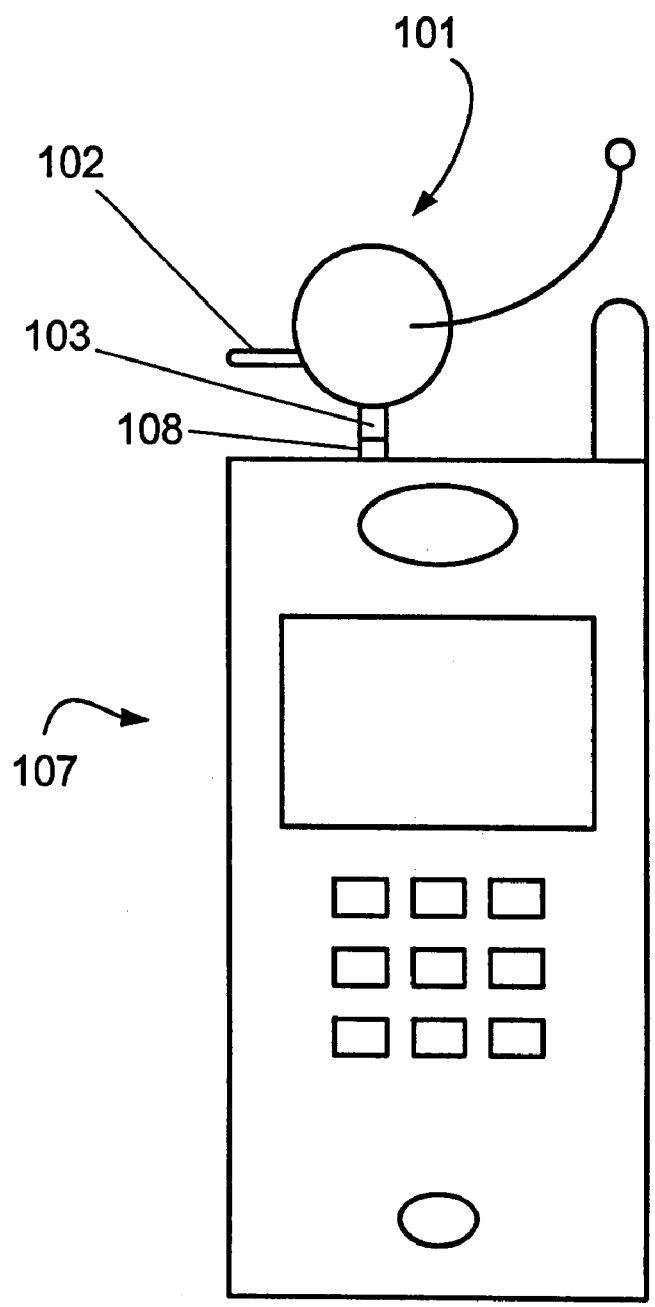
FIG. 3 is another illustration of the embodiment of the present invention shown in FIG. 1.

The headset (101) consequently includes a power coupling (103) which can be inserted into a port (108) provided on the phone unit (107). This connects the power source of the headset (101) to the power source of the phone unit (107) for recharging. FIG. 3 illustrates the headset (101) connected to the phone unit (107) for recharging.

Figure 2:
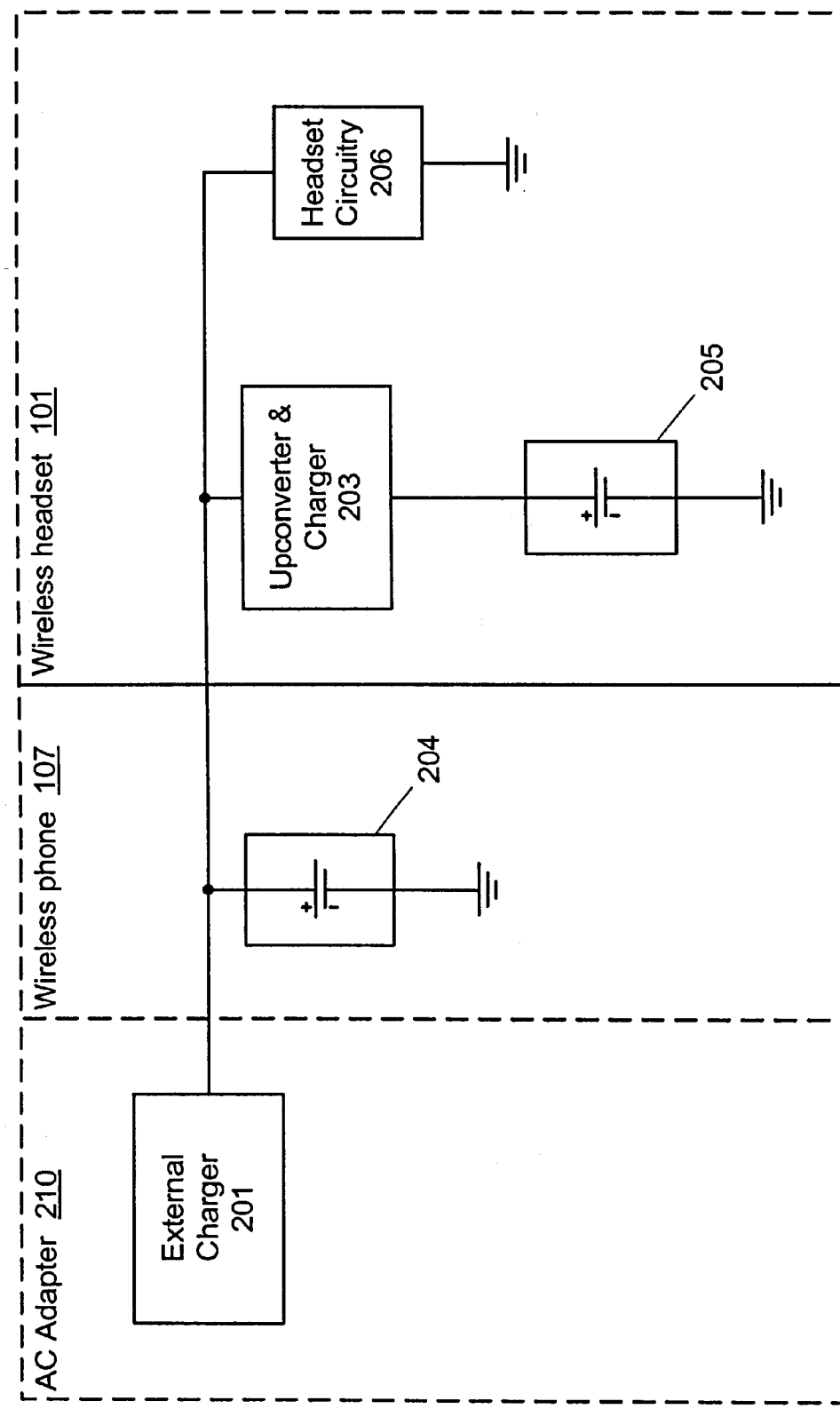
FIG. 2 is a schematic diagram of the first embodiment of the present invention shown in FIG. 1.

FIG. 2 is a schematic diagram showing the power arrangement of the phone (107) and headset (101) of the present-invention. As shown in FIG. 2, the phone (107) includes a primary battery (204) which is used to power the phone (107) and to recharge the headset (101) as necessary. The phone (107), as shown in FIG. 2, may be coupled to an external charger (201) to provide power for recharging the primary battery (204). The external charger (201) is preferably part of an A/C adapter (210) that may connect to a electrical wall outlet at home or office or to the cigarette lighter or power outlet of an automobile.

Within the wireless headset (101) is a secondary battery (205) connected to an upconverter and charger circuit (203). The upconverter and charger (203) is connected through the power coupling (103, 108) to the primary battery (204) and directly to the external charger. (201), if connected to the phone (107). In this way, the secondary battery (205) can be charged from the primary battery (204) or directly from the external charger (201), if connected.

The upconverter allows (203) allows full charging of the secondary battery unit (205) from the primary battery unit (204) even if the primary battery unit (204) is substantially depleted. However, an upconverter is only necessary if the secondary and primary batteries are of the same type, for example, both lithium-ion batteries. If the secondary and primary batteries are of different types, then no upconverter is needed. For example, if the primary battery is lithium-ion, and the secondary battery is a NiMH or NiCad battery, no upconverter would be necessary.

The headset circuitry (206) is then connected to the secondary battery (205). Consequently, the secondary battery (205) can provide power to the headset circuitry (206) when the circuitry is operational and separated from the phone unit (107).

Figure 4:
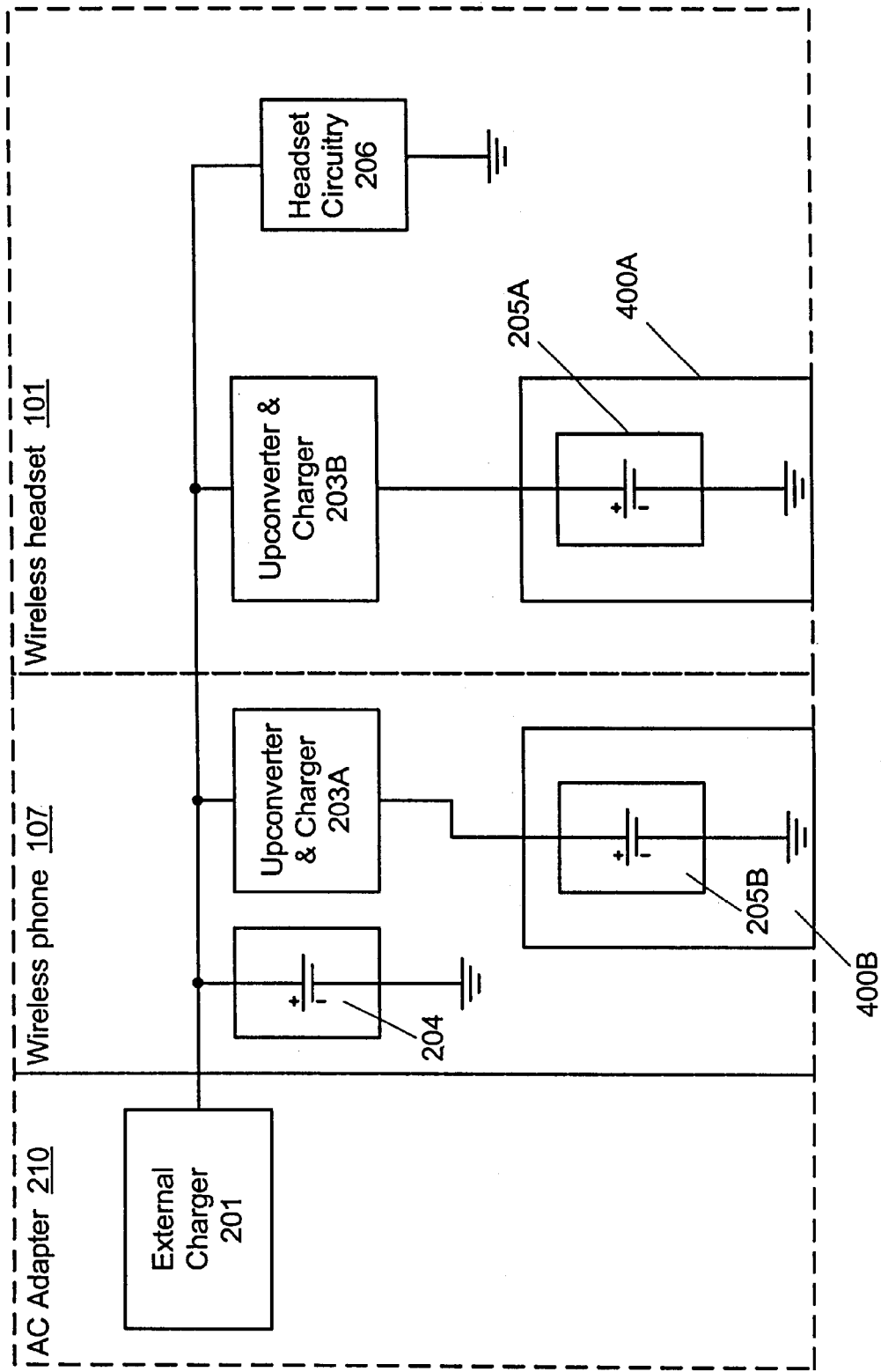
FIG. 4 is a schematic diagram of a second embodiment of the present invention.

FIG. 4 illustrates a second embodiment of the present invention, similar to the first, in which the length of time the headset (101) can be used without being connected to the wireless phone (107) is maximized by providing two interchangeable secondary batteries (205A, 205B). A shown in FIG. 4, the secondary battery (205A) in the wireless headset (101) is provided in a removable casing (400A). Consequently, when depleted, the secondary battery (205A) can be removed from the headset (101).

Appropriate electrical connectors will be provided within the headset (101) for electrically connecting the secondary battery (205A) to the upconverter and charger (203B). Corresponding electrical connectors are provided on the casing (400A) to complete the connection. A releasable latch (not shown) or other means for securing the housing (400A) in the headset (101) may be provided within the scope of the present invention.

An additional, but identical, secondary battery (205B) is also provided as part of the system of the present invention. The additional secondary battery (205B) is also housed in a housing (400B) and can be inserted in the headset (101) to provide power to the headset (101) when the first secondary battery (205A) is depleted.

When either of the secondary batteries (205A or 205B) is charged and providing power to the headset (101), the other second battery, (205B, in FIG. 4) can be inserted in or connected to the wireless phone unit (107), as shown in FIG. 4, to be recharged from the primary battery (204). A separate upconverter and charger (203A) is provided in the phone unit (107) to charge the secondary battery (205B) in the phone unit (107). Again, the upconverter may be unnecessary if the primary and secondary batteries are of the same type. Additionally, a releasable latch (not shown) or other means for securing the housing (400B) in the phone (107) may be provided within the scope of the present invention.

In this way, one secondary battery (205B) can always be charging and becoming ready for use while the other secondary battery (205A) is powering the headset (101). Consequently, if, while making calls, the user depletes the secondary battery (205A) in the headset (101), the user can switch the secondary batteries (205A, 205B) to continue placing calls. The being used battery is then recharged, while the charged battery is depleted. Thus, the user can more continuously use the headset despite the constraints of a small power source, i.e., secondary batteries (205A, 205B).

Preferably, the amount of time required to charge a secondary battery (205) is approximately equal to the time required to deplete a secondary battery (205) through continuous use. Moreover, the life of each secondary battery (205) should exceed, at least, the common length of a phone call. While these preferences are desired, they may not be fully achievable within the design constraints of any particular system.

The preceding description has been presented only to illustrate and describe the invention. It is not intended to be exhaustive or to limit the invention to any precise form disclosed. Many modifications and variations are possible in light of the above teaching.

For example, while the present invention has been described above in connection with a wireless telephone unit (107), the wireless headset and its powering arrangement of the present invention could be implemented with an personal electronic device that outputs an audio signal, for example, a personal stereo, CD, tape or mini-disc player. The present invention may also be used with a personal music device that reproduces digital music or other audio programming from an electronic memory, for example, MP3 audio files.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A personal electronic device outputting an audio signal comprising:
    a primary rechargeable battery located in said personal electronic device;
    a headset for providing wireless communication with said personal electronic device for transducing said audio signal into audible sound;
    a secondary rechargeable battery located in said headset for powering the headset;
    a headset charger disposed in said headset for recharging said secondary rechargeable battery from said primary rechargeable battery;
    an additional rechargeable secondary battery, said secondary rechargeable battery and said additional secondary rechargeable battery being interchangeable in connection to either said headset or said personal electronic device; and
    an internal charger disposed in said personal electronic device for charging either said secondary rechargeable battery or said additional secondary rechargeable battery from said primary rechargeable battery, said internal charger charging whichever secondary rechargeable battery is housed in said personal electronic device.

2. The device of claim 1, wherein said personal electronic device is a wireless telephone unit and said headset comprises a microphone.

3. The device of claim 1, wherein said secondary rechargeable battery being charged when said headset is connected to said personal electronic device by a power coupling.

4. The device of claim 1, wherein when one of said secondary rechargeable battery and said additional secondary rechargeable battery is operative for energizing said headset, a remaining one of said secondary rechargeable battery and said additional secondary rechargeable battery is housed inside said personal electronic device.

5. The device of claim 4, wherein when one of said secondary rechargeable battery and said additional secondary rechargeable battery is operative for energizing said headset, the remaining one of said secondary rechargeable battery and said additional secondary rechargeable battery housed inside said personal electronic device is operative to be recharged from the primary rechargeable battery via the internal charger housed inside said personal electronic device.

6. The device of claim 5, wherein said headset charger also comprises an upconverter.

7. The device of claim 5, further comprising an external charger for connection to said personal electronic device to recharge said primary rechargeable battery.

8. A method of powering a personal electronic device that outputs an audio signal, the method comprising:
    recharging a secondary battery located in a headset from a primary battery located in said personal electronic device, wherein said headset provides wireless communication with said personal electronic device for transducing said audio signal as audible sound;
    providing an additional secondary battery, wherein said secondary battery and said additional secondary battery are interchangeable in connection to either said headset or said personal electronic device and are sized to be housed inside the personal electronic device;
    locating an internal charger in said personal electronic device for charging either said secondary battery or said additional secondary battery; and
    charging whichever secondary battery is housed inside said personal electronic device.

9. The method of claim 8, further comprising using an upconverter in recharging said secondary battery.

10. The method of claim 8, wherein said personal electronic device is a wireless telephone unit and said headset further comprises a microphone.

11. The method of claim 8, further comprising:
    locating a headset charger in said headset; and
    performing said charging of said secondary battery when said headset is connected to said personal electronic device by a power coupling.

12. The method of claim 8, further comprising recharging said primary battery with an external charger connected to said personal electronic device.

13. A personal electronic device outputting an audio signal comprising:
    a primary rechargeable power means for powering said personal electronic device;
    a headset for providing wireless communication with the personal electronic device, said headset having means for transducing said audio signal into audible sound;
    a secondary rechargeable power means located in the headset for powering the headset;
    a headset charging means disposed in said headset for recharging said secondary rechargeable power means from said primary power means;
    an additional secondary rechargeable power means, said secondary rechargeable power means and said additional secondary rechargeable power means being interchangeable in connection to either said headset or said personal electronic device and are sized and adapted to be housed inside said personal electronic device; and an internal charging means disposed in said personal electronic device for charging either said secondary rechargeable power means or said additional secondary rechargeable power means, said internal charging means charging whichever secondary rechargeable power means is housed inside said personal electronic device.

14. The device of claim 13, wherein said headset charging means also comprises an upconverter means for charging said secondary rechargeable power means fully even if said primary rechargeable power means is depleted.

15. The device of claim 13, wherein said personal electronic device is a wireless telephone unit and said headset comprises a microphone.

16. The device of claim 13, wherein said secondary power means being charged when said headset is connected to said personal electronic device by a power coupling means.

17. The device of claim 13, further comprising an external charging means for connection to said personal electronic device to recharge said primary rechargeable power means.

18. The device of claim 13, wherein when one of said secondary rechargeable battery and said additional secondary rechargeable power means is operative for energizing said headset, a remaining one of said secondary rechargeable power means and said additional secondary rechargeable power means is housed inside said personal electronic device.

19. The device of claim 18, wherein when one of said secondary rechargeable power means and said additional secondary rechargeable power means is operative for energizing said headset, the remaining one of said secondary rechargeable power means and said additional secondary rechargeable power means and said additional secondary rechargeable power means housed inside said personal electronic device is operative to be recharged from the primary rechargeable power means via the internal charger housed inside said personal electronic device.

* * * * *